Aug. 5, 1958           C. R. MANNING           2,846,067

RECORD CONTROLLED MACHINE

Filed Dec. 21, 1951           3 Sheets-Sheet 1

INVENTOR
C. R. MANNING
BY
ATTORNEY

INVENTOR
C.R. MANNING
BY
ATTORNEY

Aug. 5, 1958   C. R. MANNING   2,846,067
RECORD CONTROLLED MACHINE
Filed Dec. 21, 1951   3 Sheets-Sheet 3

INVENTOR
C.R.MANNING
BY
ATTORNEY

2,846,067
RECORD CONTROLLED MACHINE

Clarence R. Manning, Vestal, N. Y., assignor to International Business Machines Corporation, New York, N. Y., a corporation of New York Application December 21, 1951, Serial No. 262,843

15 Claims. (Cl. 209—110)

This invention relates to record controlled distributing machines.

The primary object of the invention is to improve the machine disclosed in Patent No. 2,558,941, issued July 3, 1951.

Machines of the type disclosed in the aforesaid patent are equipped with a record sorting mechanism of the general type disclosed in Patent 1,741,985.

Patent 2,558,941 discloses a machine which is particularly adapted for statistical use wherein the primary purpose of the machine is to count classified items which are recorded in cards by means of perforations or combinations of perforations and the machine is designed to not only count items in accordance with data relationships, but also to distribute the records in accordance with arbitrary classifications derived from combinations of data perforations or data relationships occurring in the records.

Because of the fact that the reason for distributing a record to a particular pocket or destination may not be readily apparent from inspection of the record, errors in sorting of the records are quite difficult to detect by mere inspection and these errors cause considerable difficulty when the sorted records are subsequently rerun through the machine for a second statistical compilation.

In order to detect errors which are found to occur in a given batch of records and which are sometimes only detected by inconsistent results in the statistical compilations, it is necessary to scan every card and interpret the data relationships to determine which card was sorted in error and miscounted in subsequent operations. This is a very tedious task since the cards are usually handled in batches of ten thousand for the very purpose of localizing such errors to the smallest group of cards which it is economically convenient to handle.

The machine disclosed in Patent 2,558,941 is equipped with a device for checking the actual destination of the card against the destination which was selected for it by the arbitrarily set control circuits and this checking device is flexibly designed to (1) mark the card in error, (2) stop the machine, and/or (3) flash an indicator so that the operator will know when an error occurs and can remove the card from the pocket for inspection and possible correction. This narrows the field of search for an erroneous card to a maximum of thirteen cards and, when the marking device is in operation, it is very easy to detect the marked card and remove it before the entire batch is run.

It has been found that the particular checking device and circuit arrangement shown in Patent 2,558,941 sometimes gives false error indications which have been found to be caused by the accumulation of dirt and shreds of paper fuzz under the ends of the sorting blades or on the surface of the sorting commutator attached to the sorting magnet armature. Thus, the machine often is stopped unnecessarily or cards marked which are not in error. The present machine is concerned with providing a means of preventing such false error indications.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a detail view of the operating cam for the mechanism.

The card feeding and sensing mechanism and the mechanism associated with the card hopper may be similar to the mechanism disclosed in Patent 2,558,941 and consequently will not be described in detail.

Figure 1:
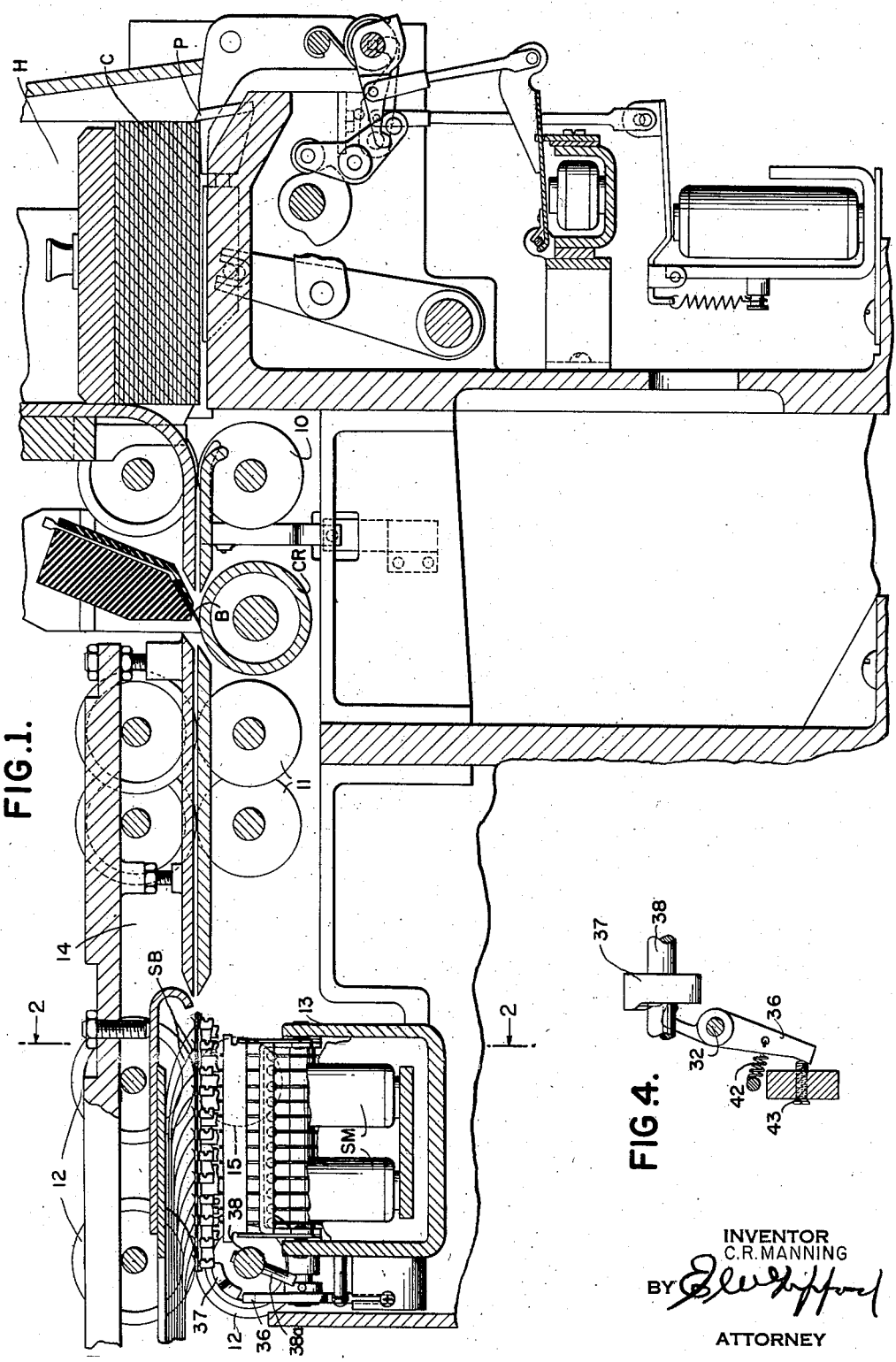
Fig. 1 is a vertical section through that portion of the machine including the card hopper, card feeding and sensing mechanism, and the sorting station.

The cards C are advanced from the hopper H by means of a picker mechanism, generally designated P in Fig. 1, which is operative in a well known way to push the bottom card from the hopper H to the left where it is gripped by a first set of feed rollers 10 and advanced to the left past the usual sensing brushes B which cooperate with the usual contact roller CR. These cards are then transported to the left by a series of feed rollers 11 and 12 past a series of destination determining members or deflectors such as the usual sorting guide blades SB which lead to the thirteen pockets into which the cards are ultimately deposited, the cards being conveyed to these pockets by rollers generally similar to the feed rollers 12.

In the present case, instead of resting on individual insulated segments of a special commutator or contact strip attached to the armature of the sorting magnet SM as in Patent 2,558,941, the blades SB control a separate switch or contact mechanism according to how the blades are selectively held up or allowed to drop by the card in a well known way. This separate contact mechanism is located beneath the ends of the blades SB and is supported by a framework comprising a casting 13 which is mounted between the front and back plates 14 of the sorting machine. Coacting with one pair of feed rollers 12 are the idler rollers 15 (Figs. 2 and 3) which are rotatable on studs 16 supported by blocks 13a carried by the frame 13. The frame 13 also adjustably supports the sorting magnet SM which is located in a pocket formed in the frame 13. The latter is preferably formed as a single casting carrying the blocks 13a and supporting the entire mechanism associated with the ends of the sorting blades SB.

The armature 17 of the sorting magnet SM is pivotally mounted on a fulcrum block 18 (Fig. 2) secured to the frame 13 adjacent the pocket in which the magnet SM is mounted and the armature is urged in a counterclockwise direction by a restoring spring 19, the lower end of which is anchored to an adjusting screw 20 for regulating the tension of the spring. The frame 13 also supports a pair of guide plates 21 over which the card passes in its movement underneath the upturned ends of the blades SB. Armature 17 is formed with tabs 17a which engage resilient stop pads fixed to the underside of the rear or right-hand plate 21, which pads act as stops for armature 17. The blocks 13a also support narrow guide plates 21a which are adjustably secured to the blocks by the screws 22 so as to support the card at its ends outside the feed rollers 12, 15.

The plates 21 are spaced apart to provide a narrow opening (Figs. 2 and 3) through which the upturned ends of the blades SB may pass and the armature 17 is formed with an inverted channel shaped portion 17b which projects upwardly into the space between the plates 21 and supports the ends of the blades, the top surface of the portion 17b being normally flush with the top surfaces of the plates 21. The channel shaped portion 17b is provided with a series of rectangular openings 17c, one for each blade SB, which is located directly opposite the upturned end of the blades so that the latter normally spans the rectangular opening and covers it.

Mounted on the frame 13 is a transverse bar 23 (Fig. 2) which is formed with a longitudinal rib 23a transversely slotted to guide and space apart a series of twelve interponents that may take the form of interposer members or levers 24 which are pivoted on a rod 25 mounted in a longitudinal slot milled in the rib 23a. The left-hand ends of the levers 24 are formed with upturned portions or tabs 24a which also are bent at varying angles to the plane of the main parts of the levers 24 and are small enough to pass through the rectangular openings 17c when necessary, as shown most clearly in Fig. 3.

Mounted on the bar 23 is a transverse bar 26 (Fig. 2) to which is secured a comb plate 27 slotted to guide the right-hand ends of the interposer levers 24 and secured to this bar 26 is a spring anchoring strip 28 for the springs 29 which are individually anchored to the levers 24 so as to tend to rotate said levers clockwise. The movement of the levers 24 under the influence of springs 29 is normally prevented, however, by a bail 30 which has its side arms pivoted in the side arms of a second bail 31 pivoted on a cross rod 32 carried by the frame 13. Also pivoted on the cross rod 32 is a series of switch operating members in the form of levers 33 which extend vertically and the upper arms are normally free of the right-hand ends of the levers 24, but in the same planes as said levers and the levers 33 at this point are provided with a clearance shoulder 33a. Springs 34 anchored to the upper arms of the levers 33 and to a flange 31b formed in the cross bar 31c hold the upper arms of the levers 33 in engagement with the cross bar 31c of the bail 31.

The bail 30 is guided vertically, parallel to the right-hand face of the bar 23, by a bracket member 35 secured to the bar 23 and vertically slotted to guide the bail. The bail 31 is secured to the shaft 32 and the latter is provided with a cam follower lever 36 (Fig. 4), the upper arm of which cooperates with a cam 37 mounted on the shaft 38 (Fig. 3) of one of the lower feed rollers 12. The left-hand pair of feed rollers 12 (Fig. 1) are interconnected by the worm 39 carried by the main drive shaft 40 (Fig. 3) which worm meshes with worm gears 41 (Fig. 3) secured to the shafts of the left-hand pair of feed rollers 12.

Also secured to the shaft 38 (Fig. 1) is a pin 38a which is long enough to engage the underside of the armature 17 and dislodge the armature from the poles of the sorting magnet SM in case it should stick due to residual magnetism. Devices of this nature are commonly called "knock-off" devices. The cam follower lever 36 (Fig. 4) is engaged with the cam 37 by means of a spring 42 and the lower end abuts an adjusting screw 43 carried by the framework which is adjusted so that the cam follower lever 36 clears the surface of the dwell in the cam so as to be affected only by the high point of the cam.

The lower ends of the levers 33 actuate destination storage means comprising individual switch devices which consist of a spring wire contact member 44 (Fig. 2), the lower end of which is hooked into an individual contact plate 45 carried by an insulating bar 46 mounted in the frame 13. The upper end of each wire contact member extends through an opening in bar 46. The upper end of the spring wire contact member 44 is actuated to the right by the lever 33, when the latter moves in a counterclockwise direction, into engagement with a common contact plate 47 carried by the bar 46. Intermediate their ends, the spring contact members 44 are in engagement with a common fulcrum member 48 which is adjusted so that the spring wires 44 are normally biased to an extent that the upper ends thereof bear lightly against the left hand walls of openings 46a, the spring tension of wires 44, however, being inferior to the tension of springs 34.

It is evident from the description thus far that the switch devices, including elements 44, 47, correspond in number to the number of pockets which may be selected for a record by magnet SM and individually, since each is controlled by a specific blade SB, numerically represent both the specific pocket numbers and the numbers of the index point positions of a card column. In sorting mechanisms of the type disclosed in Patent 1,741,985 the pockets and blades correspond numerically to the index point positions of the record card. It is clear, therefore, that the switch devices 44, 47 form a simple storage device which is selectively actuated under control of the blades SB to store or represent the actual destination or path determined for a record by blades SB.

The sorting magnet SM will be selectively energized at different times in the cycle according to the destination selected for a card and, at the time the impulse to the magnet is delivered, the card will have advanced varying distances to the left underneath the ends of blades SB with the result that, when the armature 17 is thrown downwardly by magnet SM, the left-hand edge of the card will lie between some one pair of blades, allowing the blades to the left of the leading edge of the card with reference to Fig. 1, to drop while the others to the right will be held up by the card and the card will pass between the pair of blades which form a passage for the card to a selected destination, such as a pocket, in a well-known way. When this action takes place, the blades which drop will engage the ends 24a of the levers 24 with which they are associated.

The timing of the cam 37 is such that when the left-hand edge of the card has passed under the end of the lowest blade or directly over it, according to whether or not the sorting magnet has already been energized, the bail 31 will be rocked counterclockwise drawing down the bail 30 and allowing the right-hand arms of levers 24 to follow the bail under the influence of the springs 29. For those blades which have dropped below the level of the card into the space between the plates 21, the associated levers 24 will be held in the position shown in Fig. 2 because the tension of the springs 29 is inferior to the individual tensions of the sorting blades applied at their upturned ends to the portions 24a of levers 24. Whereas, for those blades which are held up by the card, there will be a clearance between the upturned portions 24a and the blades allowing the associated levers 24 to rock slightly clockwise placing their right-hand ends in the path of the upper ends of the associated levers 33.

At the same time the bail 30 moves downwardly, the crossbar 31c of bail 31 will move to the left and levers 33 will try to follow the bail. However, when the levers 24 are rocked clockwise, the right-hand ends thereof move into a position to be engaged by the upper ends of levers 33 above notches 33a which are thereby blocked and prevented from moving more than a small amount which is incidental to the motion necessary to move the levers 24 into the path of levers 33.

Figure 2:
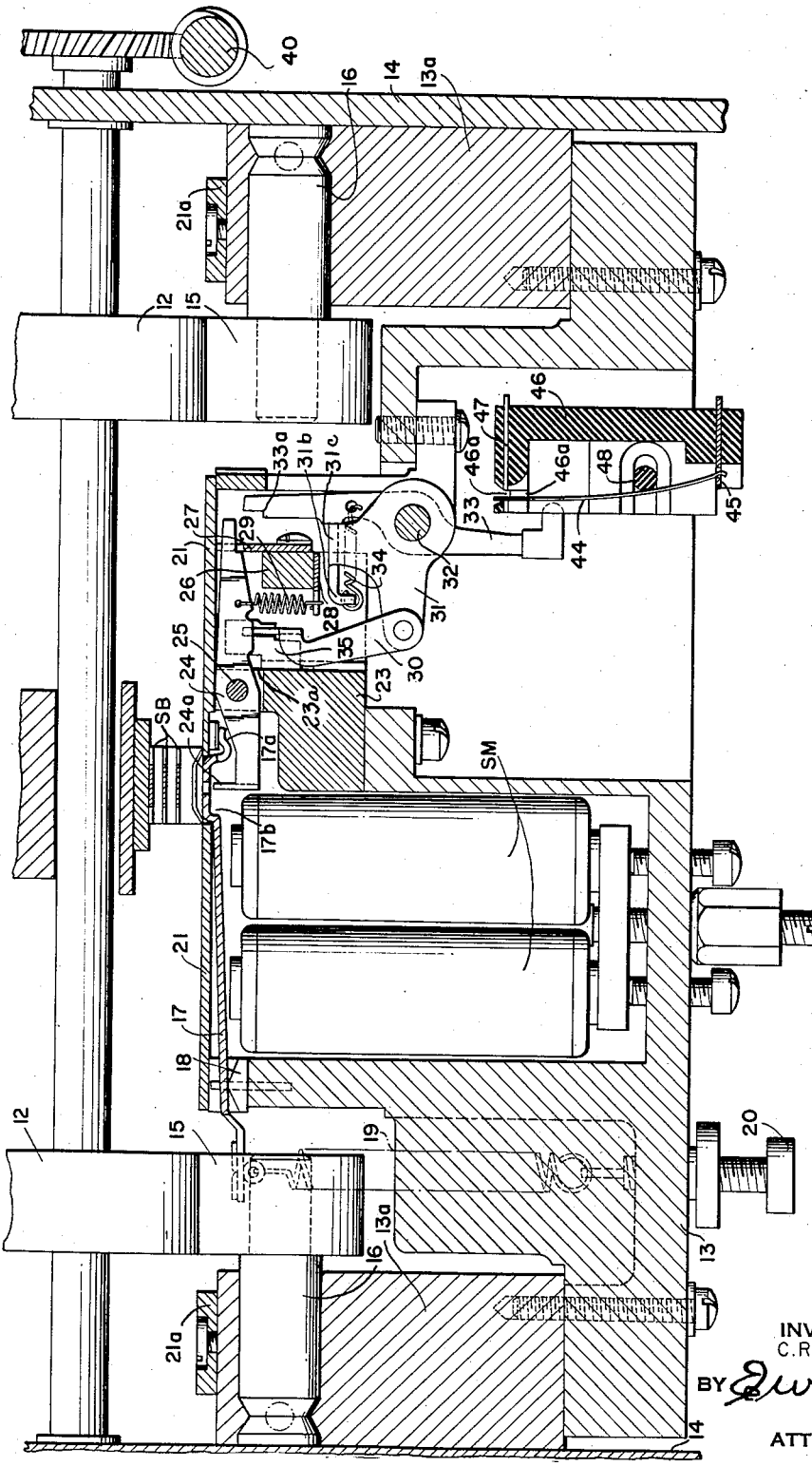
Fig. 2 is a vertical section approximately on the line 2—2 in Fig. 1.
Figure 3:
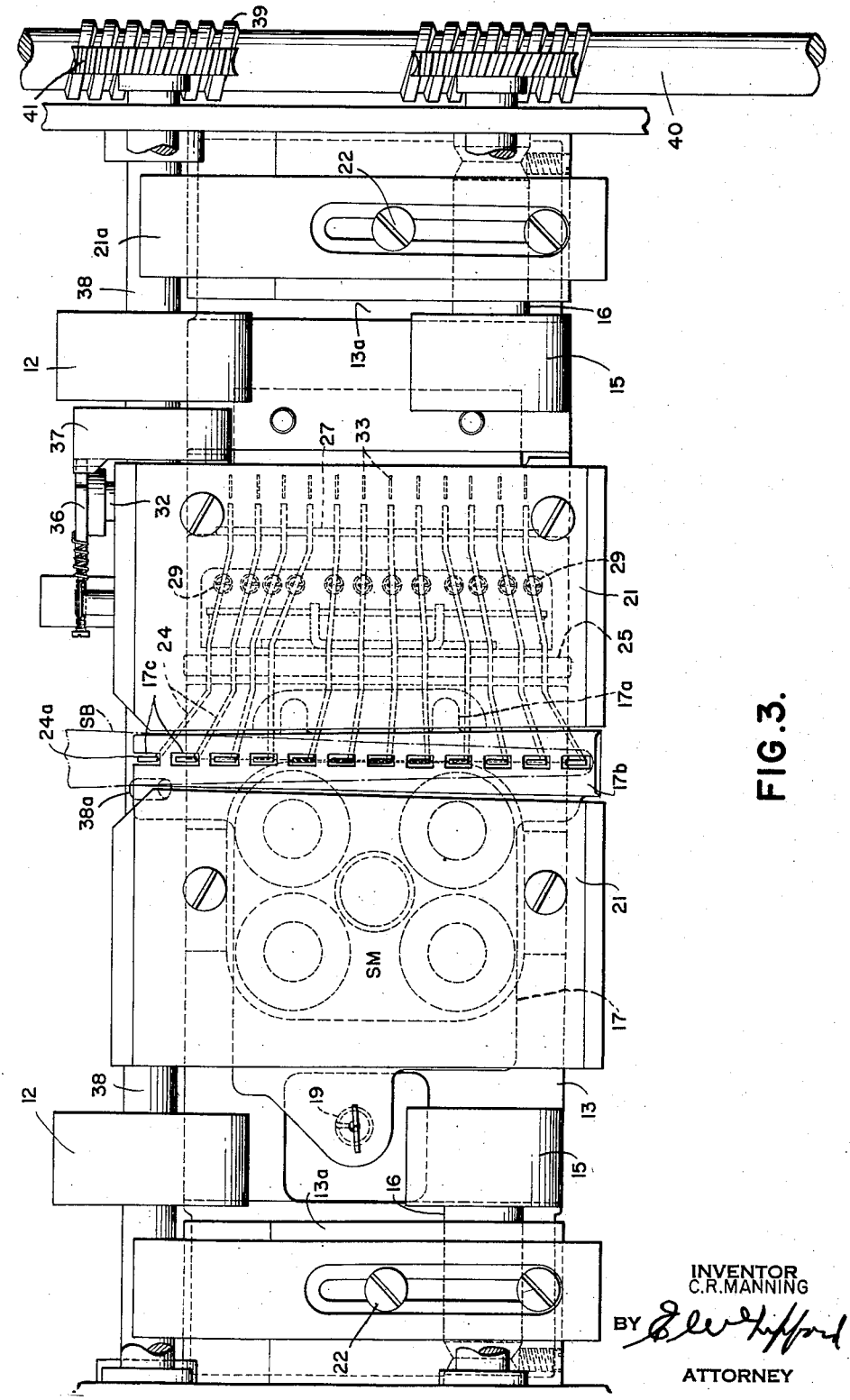
Fig. 3 is a plan view partly in section of the mechanism shown in Fig. 2.

Those levers 24 which are held in the position of Fig. 2 by the dropped blades will clear the ends of the levers 33 and the spring contact members 44 thereof will be permitted to rock clockwise and actuate the associated wires 44 to establish electrical contact with the contact plates 47. Thus, the contact members 44, 47 store a representation of the actual destination of each record by closing a plurality of separate circuits according to the number of blades which have dropped. The pairs of contacts 44, 47 may be connected in the circuit described in Patent 2,558,941 in place of the contacts established by the blades 114 and the contact elements 145a and function in identically the same way in the checking circuit as in this patent.

Later in the cycle, the pin 38a engages the armature 17 if it is still held in operated position by residual magnetism and forces the armature away from the poles of the magnet. However, under normal conditions, this will rarely happen.

One of the advantages of the invention disclosed herein is that it provides a separate contact or switch operating means which includes the bail 31 and the switch operating members 33 controlled by the interponent levers or members 24 which sense the status of the sorting blades SB without in any way adversely affecting their mechanical operation under the high speed at which this machine normally operates. This is due to the fact that the levers 24 are normally not in contact with the blades so that they are free to take their usual settings free from any reaction from contact with the members 24 which might occur if the members 24 were allowed to engage the blade ends with spring pressure and used to directly close a circuit. The levers 24 do not come into play at all until after the last possible destination has been actually determined for the card (the "12" pocket) and thereafter the switch mechanism is positively operated according to the positions taken by the levers 24. It is thus possible to use very light levers 24 and a relatively light spring tension to operate said levers at a time in the cycle when conditions have become practically static as far as the sorting magnet, the armature 17, and the blades SB are concerned. The levers 24 do not have to exert any appreciable force such as might be necessary to directly operate a contact. Consequently, there is not need for delicately balancing the spring tensions of the blades SB and the springs 29.

The switch operating mechanism comprising the bails 30, 31, springs 34, and the levers 33 merely has to sense the position of the levers 24 and therefore can be made very sturdy and positive in action and the springs need not be very critically adjusted. Thus, it is plain that the switch mechanism can be operated very positively and reliably and is not dependent upon variations in the tension of the blades.

The blades SB vary in length from a few inches to several feet and it is very difficult through production control of their shape, temper, and assembly adjustment to get the spring tension uniform. In the past, it has been relatively easy to adjust these blades for tension to insure reliable sorting but in a case where the blades have to operate other elements, it is quite difficult to insure accurate response to the position of the card insofar as the operation of separate contacts are concerned.

Since the switch mechanism is now remote from the ends of the blades and can be adequately covered, there is little chance for material like card fibers or lint interfering with their operation. Furthermore, since the blades do not have to establish direct electrical contact, oxidation on the electrical contact surfaces in engagement with the card cannot cause trouble with the electrical circuits as has been found to be the case with the structure disclosed in Patent 2,558,941.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, a series of sorting blades, means for selectively operating certain of said blades to open a passage for conveying a record to a selected destination, and switch mechanism for electrically storing the status of said blades after they have been operated comprising a series of members movable from an inoperative to an operative position by said blades, switch means for electrically storing representations of the destination determined by the operated blades, and means responsive to the positions of said members for operating said switch means selectively.

2. In a record sorting machine, a series of guide blades, each for selecting a destination for a record, means for selectively operating said blades to divide them into two groups to open a passage to a destination for a record, contact means selectively operable to store electrically a representation of the destination selected for a record, means settable by said blades to represent the destination selected thereby, and contact operating means responsive to the settings of the settable means for selectively operating the contact means in accordance with the destination selected.

3. In a record sorting machine, sorting mechanism including a series of members determining different destinations for records, means for selectively actuating said members to determine a path to a particular destination, electrical contact means selectively settable to represent electrically the path selected, means settable under control of said members to mechanically store a representation of the path selected, and contact operating means for sensing the settings of the settable means and selectively operating the contact means in accordance with said settings.

4. In a record sorting machine, a series of sorting blades; means for operating said blades to open a passage for a record to a selected destination comprising a member coacting with said blades and between which blades and said member the record passes, a magnet for actuating said member at differential times to cause some of the blades to move to one side of the line of travel of the record and the remainder to be blocked by the record to thereby open said passage; a series of electrical switches corresponding to said blades, switch operating members, interponents responsive to the movement of said blades by the operating means, and switch operating means controlled by said interponents for causing said switches to be actuated to correspond with the actuation of said blades to thereby electrically store a representation of the selected passage.

5. In a record sorting machine, a series of sorting blades; means for operating said blades to open a passage for a record to a selected destination comprising a member coacting with said blades and between which blades and said member the record passes, a magnet for actuating said member at differential times to cause some of the blades to move to one side of the line of travel of the record and the remainder to be blocked by the record to thereby open said passage; a series of electrical switches corresponding to said blades, switch operating members for said switches, and separate operating means responsive to the movement of said blades by the first operating means for causing said switches to be actuated by the switch operating members to correspond with the actuation of said blades to thereby electrically store a representation of the selected passage.

6. In a record sorting machine, a series of sorting blades; means for operating said blades to open a passage for a record to a selected destination comprising a member coacting with said blades and between which blades and said member the record passes; a magnet for actuating said member at differential times to cause some of the blades to move to one side of the line of travel of the record and the remainder to be blocked by the record to thereby open said passage; a series of electrical switch devices, each representing one of said blades for storing electrically a representation of the selected passage; a series of switch operating members, one for each device and blade; a series of interponents actuated by said blades, and switch operating means controlled by said interponents for operating said members.

7. In a record sorting machine, a series of sorting blades; means for operating said blades to open a passage for a record to a selected destination comprising a member coacting with said blades and between which blades and said member the record passes, a magnet for actuating said member at differential times to cause some of the blades to move to one side of the line of travel of the record and the remainder to be blocked by the record to thereby open said passage, a series of electrical contact devices, each representing one of said blades for storing electrically a representation of the selected passage; and a series of contact actuating members, one for each device and blade; a series of interposer levers set by the operated blades, and means common to all of said levers and contact devices and rendered effective by the set interposer levers for operating the contact actuating members corresponding to the set levers.

8. In a machine of the class described, means for selecting a destination for a record, a series of separately operable electrical contact devices representing all of the possible destinations for a record, a series of contact controlling members selectively rendered operative according to the destination selected for a record by the first means, and separate operating means for causing the contact devices to be selectively actuated under control of said members to electrically store a representation of the destination of the record.

9. In a machine of the class described, means for selecting a destination for a record, a series of separately operable electrical contact devices representing all of the possible destinations for a record, a series of contact controlling members selectively set according to the destination selected therefor by the first means, and means controlled by said members for causing the contact devices to be selectively actuated to electrically store a representation of the actual destination of the record.

10. In a record controlled machine, means for selecting a destination for a record, mechanical means controlled by the record for detecting its actual destination, electrical contact means for representing all of the possible destinations for a record and operating means controlled by the detecting means for operating the contact means selectively in accordance with the selected destination.

11. In a record controlled machine means for selecting a destination for a record, interponents controlled by the record for detecting its actual destination, electrical contact means for representing all of the possible destinations for a record, and means controlled by the interponents for operating the contact means selectively in accordance with the selected destination.

12. In a record controlled machine, record distributing mechanism including interponent members selectively set under control of a record in accordance with its actual destination; a series of separate electrical contact devices, each representing a record destination; and contact operating means controlled by said members for actuating said contact devices selectively to electrically store representations of the actual destinations.

13. In a record controlled machine, record distributing mechanism including members actuated to a set position under control of a record in accordance with its actual destination; a series of separate electrical contact devices, each representing a record destination, and contact operating means controlled by the first members sensing the positions thereof and actuating said contact devices selectively to electrically store representations of the actual destinations of records.

14. In a record controlled machine, record distributing mechanism including a series of members set by a record according to its actual destination; a series of separate electrical switches, one for each of said members for storing electrical representations of the destinations selected for a record; switch levers, one for each of said members and one of said switches; and operating means for said switches rendered effective by said members.

15. In a record controlled machine, record distributing mechanism including a series of sorting deflectors set under control of a record according to its actual destination; a series of separate electrical switches, one for each of said deflectors for storing electrical representations of the destinations selected for a record; switch levers, one for each of said deflectors and a related one of said switches and mechanical operating means for actuating said levers and controlled by said deflectors.

References Cited in the file of this patent

UNITED STATES PATENTS

| 1,502,993 | Lasker | July 29, 1924 |
| 2,107,008 | Lasker | Feb. 1, 1938 |
| 2,539,995 | Ghertman | Jan. 30, 1951 |
| 2,558,941 | Durfee | July 3, 1951 |